(12) United States Patent
Masubuchi et al.

(10) Patent No.: US 6,176,510 B1
(45) Date of Patent: Jan. 23, 2001

(54) AIR BAG COVER CONTAINING A BLOCK COPOLYMER POLYPROPYLENE RESIN BLEND

(75) Inventors: Tetsuo Masubuchi, Kawasaki; Mitsuhiro Tanaka, Yokohama, both of (JP)

(73) Assignee: Asahi Kasei Kogyo Kabushiki Kaisha (JP)

( * ) Notice: Under 35 U.S.C. 154(b), the term of this patent shall be extended for 0 days.

(21) Appl. No.: 09/195,369

(22) Filed: Nov. 18, 1998

(30) Foreign Application Priority Data

Nov. 19, 1997 (JP) .................................................. 9-318345

(51) Int. Cl.$^7$ ............................ C08L 53/02; C08L 23/10
(52) U.S. Cl. .................................... 280/728.1; 280/780.1; 524/505; 525/88; 525/89; 525/98; 525/99
(58) Field of Search ................................ 525/89, 88, 98, 525/99; 280/728.1, 743.1; 524/505

(56) References Cited

U.S. PATENT DOCUMENTS

| | | |
|---|---|---|
| H1022 | 2/1992 | Holden et al. . |
| 4,006,116 | 2/1977 | Dominguez . |
| 4,154,244 * | 5/1979 | Becker et al. .......................... 604/96 |
| 4,613,640 * | 9/1986 | Deisler et al. ......................... 524/264 |
| 5,093,422 | 3/1992 | Himes . |
| 5,733,825 * | 3/1998 | Martin et al. . |
| 5,863,977 * | 1/1999 | Fischer et al. ......................... 524/505 |
| 5,932,648 * | 8/1999 | Troska et al. ......................... 524/505 |

FOREIGN PATENT DOCUMENTS

| | | |
|---|---|---|
| 197 52 658 A1 | 6/1998 | (DE) . |
| 254 346 A2 | 1/1988 | (EP) . |
| 697 435 A1 | 2/1996 | (EP) . |
| 699 519 A2 | 3/1996 | (EP) . |
| 884 359 A1 | 12/1998 | (EP) . |
| 2 250 295 | 6/1992 | (GB) . |
| 6-200086 | 7/1994 | (JP) . |

* cited by examiner

*Primary Examiner*—Jeffrey Mullis
(74) *Attorney, Agent, or Firm*—Pennie & Edmonds LLP

(57) ABSTRACT

An elastomer composition which comprises (a) 100 parts by weight of a hydrogenated block copolymer mixture comprising: (a-1) 10 to 60 parts by weight of a block copolymer prepared by hydrogenating a block copolymer that comprises: at least two polymer blocks A each mainly comprising a vinyl aromatic compound; and at least one polymer block B mainly comprising a conjugated diene compound, the hydrogenated block copolymer having a number average molecular weight of from more than 200,000 to not more than 400,000 and a content of the polymer block A of from 15 to 40% by weight of said block copolymer; and (a-2) 40 to 90 parts by weight of a block copolymer prepared by hydrogenating a block copolymer that comprises: at least one polymer block A mainly comprising a vinyl aromatic compound; and at least one polymer block B mainly comprising a conjugated diene compound, the hydrogenating block copolymer having a number average molecular weight of from more than 30,000 to not more than 140,000 and a content of the polymer block A of from 8 to 35% by weight of said block copolymer; and (b) 30 to 125 parts by weight of a polypropylene resin having a melt flow rate of from 5 to 100 g/10 minutes; (c) 0 to 50 parts by weight of a hydrocarbon oil. Also disclosed is a housing cover of air bag apparatus, which comprises the elastomer composition.

5 Claims, 2 Drawing Sheets

AIR BAG COVER CONTAINING A BLOCK COPOLYMER POLYPROPYLENE RESIN BLEND

FIELD OF THE INVENTION

This invention relates to a thermoplastic elastomer composition which can be used as a raw material of various molded articles having excellent scratch resistance, flexibility, heat resistance, low temperature characteristics, weather resistance, strength and moldability. Particularly, this invention relates to an elastomer composition which has excellent properties as an air bag apparatus-housing cover designed in such a manner that, when collision or the like accident happens, the driver or a passenger in an automobile or the like high-speed movable body is protected from secondary collision with the operating unit or with instrument panel by confining the person to the seat. It also relates to an air bag apparatus-housing cover.

BACKGROUND OF THE INVENTION

In stead of the formerly used vulcanized rubber as the main material, thermoplastic elastomers are now used frequently in automobile parts, electric household appliances, medical device components and miscellaneous goods because of their excellent productivity. Examples of such cases include olefin elastomers comprising ethylene-propylene copolymer and polypropylene, polyurethane elastomers, soft polyvinyl chloride and the like.

Each of these molding materials, however, has disadvantages in terms of scratch resistance, flexibility, moldability, economical efficiency and recycling ability. That is, olefin elastomer is relatively cheap and excellent in weather resistance and heat resistance. However, it is inferior to other materials in flexibility and scratch resistance. Polyurethane elastomer has excellent scratch resistance but has disadvantages in its poor flexibility and weather resistance. Moreover, it is expensive. Also, soft vinyl chloride is relatively cheap and excellent in weather resistance and scratch resistance but is disadvantageous in poor flexibility, low temperature characteristics and recycling ability.

In addition, there have been proposed some elastomer compositions with the use of hydrogenated derivatives of a vinyl aromatic compound-conjugated diene compound block copolymer (hereinafter referred to as a "Hydrogenated block copolymer"). For example, JP-A-50-14742, JP-A-52-65551 and JP-A-58-206644 (the term "JP-A" as used herein means an "unexamined published Japanese patent application") each discloses a composition in which a hydrogenated block copolymer is blended with a rubber softening agent and an olefin resin. However, these compositions are also poor in scratch resistance similar to the case of olefin elastomers.

On the other hand, the air bag system is principally composed of a collision sensing device which detects collision of a high-speed movable body and an air bag apparatus. The latter air bag apparatus is composed of an air bag, a gas generator which generates a gas to inflate the air bag, a housing cover which contains the air bag and gas generator and an adaptor (retainer) which attaches the gas generator and housing cover. The air bag apparatus is attached to the front side of an occupant in a high-speed movable body, and, when the collision sensing device is activated by a collision, the gas is generated instantaneously from the gas generator and filled in the air bag which is folded and contained in a space formed by the surrounding gas generator, housing cover and retainer, and the housing cover is then deployed by the pressure of gas filled in the air bag which is immediately released and inflated from the opening created by the deployment toward the front side of the occupant, so that the occupant is confined to the seat and prevented from injuries by collision with the operating unit or instrument panel. In consequence, when the gas generator is activated by a collision or the like accident, the housing cover of air bag apparatus must release the bag instantaneously through its accurate deployment without spreading splinters having a danger of injuring the occupant.

As such a housing cover of air bag apparatus, JP-A-50-127336 or JP-A-55-110643 has proposed an air bag apparatus-housing cover formed from a urethane resin containing a reinforcing net mainly made of nylon.

Since a reinforcing nylon net is used, the just described air bag-housing cover is free from the problem of generating cracking on a part other than the opening portion and causing scattering of a part of the cover when the cover is deployed. However, it has other problems such as a prolonged period of time necessary for incorporating the reinforcing net or displacement of the position of the reinforcing net at the time of molding. Further, it suffers from another disadvantage of a poor productivity.

Also, JP-A-202550 proposes a housing cover having a structure wherein a surface layer made of a soft material having an A hardness according to JIS K6301 of form 30 to 70 and a core layer made of a hard resin having flexibility are integrally molded and a slit for cleavage use is arranged on the core layer. The housing cover of this proposal is desirable in terms that it has a certain degree of rigidity and gives the occupant proper feel. However, it has a problem such that, because of consisting of the core layer and surface, it should be produced by two layer molding by using an expensive double layer molding machine provided with two sets of injection mechanism. In addition, the surface layer soft material has poor surface scratch resistance and, therefore, it is needed to coat the surface after the double layer molding, thus resulting in high cost.

JP-A-38966 proposes an air bag apparatus-housing cover formed from a thermoplastic elastomer composition mainly comprising a hydrogenated styrene-conjugated diene block copolymer having an A hardness according to JIS K6301 of from 60 to 85. Although this housing cover is desirable in giving the occupant properly soft feel and realizing adaptability over a broad temperature range, it has a problem of the necessity of surface coating after injection molding because of its poor scratch resistance, thus resulting in high cost.

SUMMARY OF THE INVENTION

The present invention has been made by taking into account the aforementioned problems encountering in the conventional techniques.

An object of the present invention is to provide a thermoplastic elastomer composition having improved scratch resistance, while keeping the excellent characteristics such as flexibility, weather resistance, heat resistance, low temperature characteristics, strength, moldability and the like of a hydrogenated block copolymer.

Another object of the present invention is to provide a housing cover of air bag apparatus comprising the elastomer composition which requires no surface coating and therefore is low in production cost.

Other objects and effects of the present invention will become apparent from the following description.

The above described objects of the present invention have been achieved by providing the following elastomer compositions.

1) An elastomer composition which comprises:
   (a) 100 parts by weight of a hydrogenated block copolymer mixture comprising:
      (a-1) 10 to 60 parts by weight of a block copolymer prepared by hydrogenating a block copolymer that comprises:
         at least two polymer blocks A each mainly comprising a vinyl aromatic compound; and
         at least one polymer block B mainly comprising a conjugated diene compound,
      the hydrogenated block copolymer having a number average molecular weight of from more than 200,000 to not more than 400,000 and a content of the polymer block A of from 15 to 40% by weight of said block copolymer; and
      (a-2) 40 to 90 parts by weight of a block copolymer prepared by hydrogenating a block copolymer that comprises:
         at least one polymer block A mainly comprising a vinyl aromatic compound; and
         at least one polymer block B mainly comprising a conjugated diene compound,
      the hydrogenated block copolymer having a number average molecular weight of from more than 30,000 to not more then 140,000 and a content of the polymer block A of from 8 to 35% by weight of said block copolymer; and
   (b) 30 to 125 parts by weight of a polypropylene resin having a melt flow rate of from 5 to 100 g/10 minutes;
   (c) 0 to 50 parts by weight of a hydrocarbon oil.

2) The elastomer composition according to the above 1), wherein said vinyl aromatic compound is styrene and said conjugated diene compound is butadiene, isoprene or a combination thereof.

3) The elastomer composition according to the above 1), wherein said polypropylene resin substantially composed of either or both of a propylene homopolymer and a copolymer of propylene with a $C_{2-8}$ α-olefin, and has a flexural modulus substantially not less than 800 MPa.

4) The elastomer composition according to the above 1), wherein said hydrocarbon oil is a non-aromatic mineral oil.

5) The elastomer composition according to the above 1), wherein the content of said hydrocarbon oil is 10 to 40 parts by weight.

The present invention also relates to a housing cover of air bag apparatus, which comprises the elastomer composition according to any one of the above 1) to 5).

Figure 1:
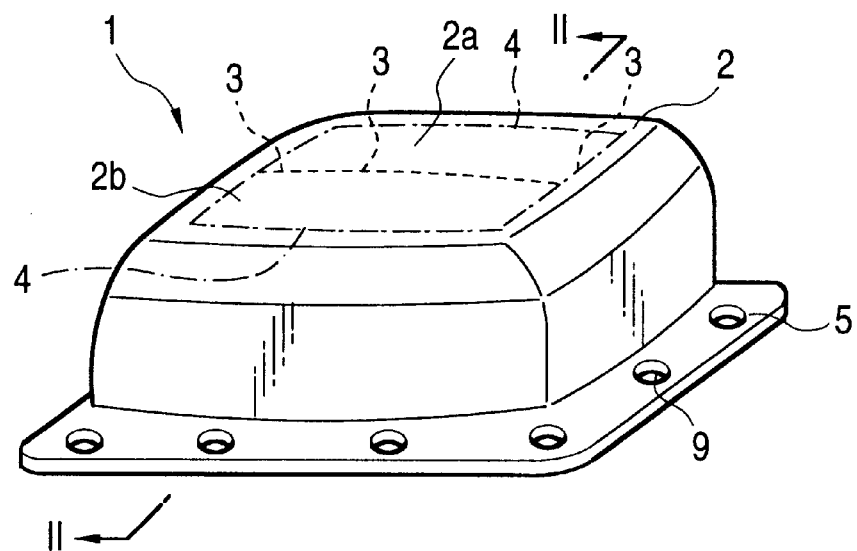
FIG. 1 is a perspective diagram showing an example of the housing cover of air bag apparatus for driver's seat according to the present invention.

In these figures, each numerical symbol has the following meaning:

DETAILED DESCRIPTION OF THE INVENTION

The present invention is described in detail below.

The vinyl aromatic compound which constitutes the component (a), i.e., the hydrogenated block copolymer, for use in the present invention may be one or more compounds selected from among, for example, styrene, α-methylstyrene, vinyltoluene, p-tert-butylstyrene and the like. Of these, styrene is preferred.

As the conjugated diene compound, one or more compounds may be selected from among, for example, butadiene, isoprene, 1,3-pentadiene, 2,3-dimethyl-1,3-butadiene and the like. Of these, butadiene, isoprene or a combination thereof is preferred. With regard to the polymer block B mainly comprising the conjugated diene compound prior to hydrogenation, microstructure of the block can be optionally selected. For example, a polybutadiene block may have a 1,2-vinyl bond structure in an amount of from 20 to 50% by weight, preferably from 25 to 45% by weight, and a polyisoprene block may have a 1,4-vinyl bond in an amount of 80% by weight or more, preferably 90% by weight or more.

In the present invention, two types of the hydrogenated block copolymers (a-1) and (a-2) are used. The hydrogenated block copolymer (a-1) has a number-average molecular weight of from more than 200,000 to not more than 400,000, preferably from 220,000 to 350,000 and still preferably from 250,000 to 300,000. The content of polymer block A in hydrogenated block copolymer (a-1) is from 15 to 40% by weight, preferably 20 to 35% by weight. If the number-average molecular weight of the hydrogenated block copolymer (a-1) is not more than 200,000, strength and heat resistance of the resulting elastomer composition are undesirably reduced. On the other hand, if the number-average molecular weight of the hydrogenated block copolymer exceeds 400,000, the moldability (flowability) of the elastomer composition is undesirably reduced, and the appearance of the molded product (generation of flow marks) is deteriorated. Also, if the content of the polymer block A in the copolymer is less than 15% by weight, the strength and heat resistance of the resulting elastomer composition are undesirably reduced. On the other hand, if the content of the polymer block A exceeds 40% by weight, the scratch resistance and flexibility of the elastomer composition as well as the moldability and low temperature characteristics are undesirably deteriorated.

The hydrogenated block copolymer (a-2) has a number-average molecular weight of from more than 30,000 to not more than 140,000, preferably from 50,000 to 120,000 and still preferably from 60,000 to 90,000. The content of polymer block A in the hydrogenated block copolymer (a-2) is from 8 to 35% by weight, preferably 10 to 30% by weight and still preferably 15 to 25% by weight, of the copolymer. If the number-average molecular weight of the hydrogenated block copolymer is not more than 30,000, strength and heat resistance of the resulting elastomer composition are undesirably reduced. On the other hand, if the number-average molecular weight of the hydrogenated block copolymer exceeds 140,000, the moldability (flowability) of the elastomer composition is undesirably reduced, and the appearance of the molded product (generation of flow marks) is deteriorated. Also, if the content of the polymer block A in the copolymer is less than 8% by weight, the strength and heat resistance of the resulting elastomer composition are undesirably reduced. On the other hand, if the content of the polymer block A exceeds 35% by weight, the scratch resistance and flexibility of the elastomer composition are undesirably deteriorated.

The hydrogenated block copolymers (-1) and (a-2) each has a molecular weight distribution (i.e., a ratio of weight average molecular weight (Mw) to number-average molecular weight (Mn), (Mw/Mn)) of 5 or less, preferably 2 or less and still preferably 1.5 or less. If the molecular weight distribution exceeds 5, it may undesirably result in insufficient strength and heat resistance of the elastomer composition.

The molecular weight and molecular weight distribution as used herein can be measured by, for example, a GPC (gel permeation chromatography) method. In the GPC analysis, the molecular weight can be calculated by using a calibration curve prepared from standard polystyrene.

The hydrogenated block copolymer to be used as the component (a-1) in the present invention is a block copolymer prepared by hydrogenating a block copolymer which comprises at least two polymer blocks A each mainly comprising a vinyl aromatic compound and at least one polymer block B mainly comprising a conjugated diene compound. Examples of its structure include A—B—A, B—A—B—A, A—B—A—B—A and B—A—B—A—B.

The hydrogenated block copolymer to be used as the component (a-2) in the present invention is a block copolymer prepared by hydrogenating a block copolymer which comprises at least one polymer block A mainly comprising a vinyl aromatic compound and at least one polymer block B mainly comprising a conjugated diene compound. Examples of its structure include A—B, A—B—A, B—A—B—A, A—B—A—B—A and B—A—B—A—B.

Although a composition of the A—B structure has a good scratch resistance, a hydrogenated block copolymer (a-2) particularly preferably, from the viewpoints of strength and heat resistance, is one obtained by hydrogenating a block copolymer which comprises at least two polymer blocks A each mainly comprising a vinyl aromatic compound and at least one polymer block B mainly comprising a conjugated diene compound and having a structure of, for example, A—B—A, B—A—B—A, A—B—A—B—A or B—A—B—A—B.

With regard to the polymer block A mainly comprising a vinyl aromatic compound, and the polymer block B mainly comprising a conjugated diene compound, of the hydrogenated block copolymer to be used as the component (a-1) or (a-2) for use in the present invention, the distribution of the vinyl aromatic compound or of the conjugated diene compound in respective polymer block may be random or tapered (monomer component increases or decreases along the molecular chain) or in a particularly block form, or an arbitrary combination thereof. Further, when two or more units of the polymer block A and polymer block B are present, these units of each polymer block may have the same or different structures. The term "mainly comprising" as used herein means that the content of the monomer unit is at least 50% by weight, preferably at least 70% by weight, of the polymer block.

Regarding the blending ratio of the hydrogenated block copolymer (a-1) and the hydrogenated block copolymer (a-2), the block copolymer (a-1) is used in an amount of from 10 to 60 parts by weight, preferably from 20 to 50 parts by weight, while the block copolymer (a-2) is used in an amount of from 40 to 90 parts by weight, preferably from 50 to 80 parts by weight, based on 100 parts by weight of the total hydrogenated block copolymer. If the amount of the block copolymer (a-1) is less than 10 parts by weight, the strength and heat resistance of the resulting elastomer composition are undesirably reduced. On the other hand, if the amount of the block copolymer (a-2) exceeds 60 parts by weight, the moldability (flowability) of the elastomer composition is undesirably reduced and the appearance of the molded product (generation of flow marks) is deteriorated.

The method for the production of these block copolymers is not particularly restricted, so long as the product has the aforementioned structure. A vinyl aromatic compound-conjugated diene compound block copolymer before the hydrogenation can be synthesized, for example, in an inert solvent in the presence of a lithium catalyst in accordance with the method described in JP-B-40-23798 (the term "JP-B" as used herein means an "examined Japanese patent publication").

Examples of the hydrogenation method include those described in JP-B-42-8704, JP-b-43-6636, JP-A-60-220147, JP-A-61-33132 and JP-A-62-207303. The reaction conditions are selected so that at least 80%, preferably 90% or more, of the aliphatic double bond of the conjugated diene compound is hydrogenated, while 20% or less, preferably 10% or less, of the vinyl aromatic compound is hydrogenated. The hydrogenation ratio of the hydrogenated block copolymer can be readily known by an infrared spectral analysis or a nuclear magnetic resonance analysis.

The component (b) for use in the present invention is a polypropylene resin.

The polypropylene resin is preferably a propylene homopolymer or a copolymer of propylene with a $C_{2-8}$ α-olefin (hereinafter referred to as a "propylene resin"). In the case of a copolymer of propylene with a $C_{2-8}$ α-olefin, examples of the α-olefin include ethylene, butene-1, isobutene, pentene-1, hexene-1, 4-methylpentene-1, octene-1, etc. Use can be made of one containing not more than 30% by weight of the α-olefin. These propylene resins can be synthesized by well known methods. Examples thereof include a propylene homopolymer synthesized by using a Ziegler-Natta catalyst and random or block propylene/α-olefin copolymers. It is preferable to use a polypropylene resin as the polyolefin resin to give an elastomer composition having excellent heat resistance and moldability.

The polyolefin resin has a melt flow rate (as measured at 230° C. under a load of 2.16 kg in accordance with the procedure of ASTM D1238; hereinafter referred to as "MFR") of from 5 to 100 g/10 minutes, preferably from 10 to 60 g/10 minutes. MFR values less than 5 g/10 minutes are not preferred because, in such a case, the melt viscosity of the elastomer composition becomes high, the moldability (flowability) thereof is reduced, and thus the appearance of the molded product (generation of flow marks) is deteriorated. On the other hand, MFR values exceeding 100 g/10 minutes are not preferred too, since the strength and heat resistance of the elastomer composition are undesirably reduced in such a case.

The polypropylene resin preferably has a flexural modulus of not less than 800 MPa, more preferably 900 MPa or more and still preferably 1,000 MPa or more. If the flexural modulus of the polypropylene resin is less than 800 MPa, the hardness and heat resistance of the elastomer composition tends to be undesirably reduced.

The blending ratio of the polyolefin resin in the component (b) of the present invention is from 30 to 125 parts by weight, preferably from 55 to 100 parts by weight, per 100 parts by weight of the hydrogenated block copolymer. If the content of the polyolefin resin is less than 30 parts by weight, the heat resistance and moldability (flowability) of the elastomer composition are undesirably reduced and the appearance of the molded product (generation of flow marks) is deteriorated. On the other hand, if the content of the polyolefin resin exceeds 125 parts by weight, the flexibility of the elastomer composition is undesirably reduced.

The component (c) for use in the present invention is a hydrocarbon oil which has an effect of improving flexibility and moldability of the obtained composition. It is suitable to use a non-aromatic mineral oil or a liquid or low molecular weight synthetic softening agent therefor. As the non-aromatic mineral oil, generally known paraffin oils and naphthene oils can be used, and a paraffin oil containing 10% by weight or less of aromatic ring components is particularly desirable therefor. The blending amount of the hydrocarbon oil is within the range of from 0 to 50 parts by weight, preferably from 5 to 45 parts by weight and still preferably from 10 to 40 parts by weight, based on 100 parts by weight of the hydrogenated block copolymer. If the content of the hydrocarbon oil exceeds 50 parts by weight, the scratch resistance and heat resistance of the elastomer composition are undesirably reduced.

If desired, the composition of the present invention may further contain additives such as an inorganic filler, a stabilizing agent, a lubricating agent, a coloring agent, silicone oil and a frame retardant agent. Examples of the inorganic filler include calcium carbonate, talc, magnesium hydroxide, mica, barium sulfate, silica (white carbon), titanium di-oxide and carbon black. Examples of the stabilizing agent include a hindered phenol based antioxidant, a phosphate based heat stabilizer, a hindered amine based light stabilizer and a benzotriazole based UV absorbent. Examples of the lubricating agent include stearic acid, a stearic ester and a metal stearate.

Regarding the production method of the elastomer composition of the present invention, any known conventional method may be used for blending polymer components. In order to obtain the most uniform blend, it is desirable to carry out melt kneading with the use of a mixing roller, a kneader, a Banbury mixer, an extruder and the like various kneading machines. An elastomer composition with improved uniformity can be obtained by first dry-blending these components with the use of a Henschel mixer, a tumbler, a ribbon mixer or the like mixing machine and then subjecting the resultant mixture to melt-kneading.

To mold the elastomer composition of the present invention, use can be made of injection molding, extrusion molding, compression molding, etc. The elastomer composition of the present invention has characteristic nature that it shows excellent moldability particularly in injection molding. In the case of injection molding, an injection-molded product can be obtained within a short period of time by using a usual plastic molding machine. Moreover, since the elastomer composition of the present invention has excellent thermal stability, it is advantageous in that the sprue part and runner part can be recycled.

In addition, injection molding can be suitably used as a method for further molding the thus obtained composition into a housing cover of air bag apparatus. A housing cover of air bag apparatus can be obtained within a short period of time by feeding the composition into an injection molding machine equipped with a mold of the housing cover of air bag apparatus and then carrying out injection molding. Also, since the elastomer composition of the present invention has excellent thermal stability, it can achieve an additional advantage such that the sprue part and runner part can be recycled.

In order to ensure that the housing cover of air bag apparatus is deployed and the air bag is instantaneously released, it is desirable to arrange a tear line designed in advance on the cover. The tear line is designed in an H shape, a U shape or the like, by taking into account the position of a passenger, the position of the air bag apparatus to be arranged, the releasing direction of the air bag, the shape of the cover, etc. Also, the tear line can be made into a V shape, U shape or the like groove by reducing thickness of the line along the portion to be cleaved.

Although it is economically advantageous to carry out monolayer molding of the air bag cover of the present invention by injection molding, it may be used as a composite layer with other plastic material so as to reinforce its attaching part and improve the rigidity of the product. When a composite cover is molded, a double layer injection molding or an adhesive-aided method can be employed, and the elastomer composition of the present invention can be used suitably as a surface covering material due to its excellent scratch resistance.

The present invention will be described in greater detail with reference to the following Examples, but the invention should not be construed as being limited thereto.

Test methods used for the evaluation of various properties in the Examples and Comparative Examples described below are as follows:
(1) Hardness:
   Measured in accordance with JIS K6301, A type, at 23° C.
(2) Tensile Strength (kgf/cm$^2$):
   Measured in accordance with JIS K6301, No. 3 dumbbell. A press sheet of 2 mm in thickness was used as a sample.
(3) Elongation (%):
   Measured in accordance with JIS K6301, No. 3 dumbbell. A press sheet of 2 mm in thickness was used as a sample.
(4) Heat Sag (mm):
   A test piece of 110 mm in length, 12.5 mm in width and 2 mm in thickness was formed by using an injection molding machine. The test piece was allowed to stand for 24 hours or more in an atmosphere of 23° C. and 50% relative humidity. A square iron column of 80 mm in height was placed on a horizontal iron plate, and one side of the test piece was fixed on the upper surface of the square iron column in such a manner that 80 mm portion of the test piece was overhung (the fixed part was horizontally set). The thus prepared sample was allowed to stand for one hour in an oven preheated to 100° C. and then taken out. The height between the tip part of the sample opposite to the fixed part and the horizontal plate was measured before and after the heating treatment in the oven, and the difference was regarded as the result.
(5) Melt Flow Rate (MFR) (g/10 Minutes):
   Measured in accordance with ASTM D1238, at 230° C. under a load of 2.16 kg.
(6) Scratch Resistance and Gloss Retention (%):
   A plate having smooth surface was formed by injection molding. The plate was horizontally arranged, and a cotton cloth onto which a load of 40 g/cm$^2$ was applied was put on the plate and reciprocated 200 times. The degree of gloss of the rubbed surface was measured in accordance with the procedure of JIS K7105 (E1), and the gloss retention, (E1/E0)×100 (%), form the degree of gloss before the rubbing (E0) was calculated.
(7) De-Embossing Test:
   A plate having a surface emboss (satin finished surface, about 20 μm in edging depth) was formed by injection molding. The plate was allowed to stand for 168 hours in an oven at 100° C. After taking out from the oven, the conditions of its surface were observed with the naked eye, and the results were expressed in "G: no change", "F: slightly glossy" or "P: glossy".
(8) Moldability:
   An air bag apparatus-housing cover for driver's seat use, which had a thickness of 4 mm, a breaking-planed part (tear line) thickness of 0.5 mm and a hinge part thickness of 2.5 mm, was formed by using an injection molding machine under the following conditions. The appearance of the molded article was observed with the naked eye to evaluate flow mark, glass, etc. The results were expressed in "G: good", "F: slightly bad", "U: somewhat bad", "P: bad" and "W: very bad".

| Cylinder temperature: | C1 180° C. |
| --- | --- |
| | C2 190° C. |
| | C3 190° C. |
| Nozzle temperature: | 200° C. |
| Injection speed: | low |
| Mold temperature: | 40° C. |

(9) Deployment Performance of Housing Cover:

An air bag apparatus was assembled by attaching an air bag and a housing cover to an adapter (retainer) made of iron and further attaching a gas generator thereto. Next, the thus assembled air bag apparatus was put into an oven controlled at a deployment temperature (−40° C., 23° C. or 90° C.). After the inner temperature became stable, the air bag apparatus was allowed to stand for 1 hour and then taken out from the oven. Subsequently, it was attached to a stand and then energized to deploy it (energized within 1 minute after taking out from the oven). The deployment performance was regarded as good when the housing cover was broken at the breaking-planned part without generating any broken fragments and the air bag was deployed smoothly.

The components used in the Examples and Comparative Examples were as follows.

Component (a-1)-1

A hydrogenated block copolymer of a styrene/butadiene block copolymer having a structure of A-B-A, a number average molecular weight of 270,000, a molecular weight distribution of 1.2, a bonded styrene content of 31% by weight, a 1,2-vinyl bond content in the polybutadiene moiety prior to the hydrogenation of 38% by weight and a hydrogenation ratio in the polybutadiene moiety of 99% was synthesized in accordance with the method described in JP-A-60-220147.

Component (a-1)-2

A hydrogenated block copolymer of a styrene/butadiene block copolymer having a structure of A-B-A, a number average molecular weight of 220,000, a molecular weight distribution of 1.1, a bonded styrene content of 32% by weight, a 1,2-vinyl bond content in the polybutadiene moiety prior to the hydrogenation of 37% by weight and a hydrogenation ratio in the polybutadiene moiety of 99% was synthesized in accordance with the method described in JP-A-60-220147.

Component (a-1)-3

A hydrogenated block copolymer of a styrene/isoprene block copolymer having a structure of A-B-A, a number average molecular weight of 290,000, a molecular weight distribution of 1.2, a bonded styrene content of 28% by weight, a 1,4-bond content and a 3,4-bond content in the polyisoprene moiety prior to the hydrogenation of 94% by weight and 6% by weight respectively and a hydrogenation ratio in the polyisoprene moiety of 99% was synthesized in accordance with the method described in JP-A-60-220147.

Component (a-1)-4

A hydrogenated block copolymer of a styrene/butadiene block copolymer having a structure of B-A-B-A, a number average molecular weight of 250,000, a molecular weight distribution of 1.2, a bonded styrene content of 34% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (a-1)-5

A hydrogenated block copolymer of a styrene/butadiene block copolymer having a structure of A-B-A, a number average molecular weight of 250,000, a molecular weight distribution of 1.2, a bonded styrene content of 45% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (a-1)-6

A hydrogenated block copolymer of a styrene/butadiene block copolymer having a structure of B-A-B-A, a number average molecular weight of 170,000, a molecular weight distribution of 1.2, a bonded styrene content of 33% by weight, a 1,2-vinyl bond content in the polybutadiene moiety prior to the hydrogenation of 38% by weight and a hydrogenation ratio in the polybutadiene moiety of 99% was synthesized in accordance with the method described in JP-A-60-220147.

Component (a-2)-1

A hydrogenated block copolymer of a styrene/butadiene block copolymer having a structure of A-B-A, a number average molecular weight of 90,000, a molecular weight distribution of 1.10, a bonded styrene content of 21% by weight, a 1,2-vinyl bond content in the polybutadiene moiety prior to the hydrogenation of 38% by weight and a hydrogenation ratio in the polybutadiene moiety of 99% was synthesized in accordance with the method described in JP-A-60-220147.

Component (a-2)-2

A hydrogenated block copolymer of a styrene/butadiene block copolymer having a structure of B-A-B-A, a number average molecular weight of 65,000, a molecular weight distribution of 1.13, a bonded styrene content of 30% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (a-2)-3

A hydrogenated block copolymer of a styrene/isoprene block copolymer having a structure of A-B-A, a number average molecular weight of 55,000, a molecular weight distribution of 1.1, a bonded styrene content of 25% by weight, a 1,4-bond content and a 3,4-bond content in the polyisoprene moiety prior to the hydrogenation of 94% by weight and 6% by weight respectively and a hydrogenation ratio in the polybutadiene moiety of 98% was synthesized in accordance with the method described in JP-A-60-220147.

Component (a-2)-4

A hydrogenated block copolymer of a styrene/butadiene block copolymer having a structure of A-B-A, a number average molecular weight of 25,000, a molecular weight distribution of 1.14, a bonded styrene content of 21% by weight, a 1,2-vinyl bond content in the polybutadiene moiety prior to the hydrogenation of 38% by weight and a hydrogenation ratio in the polybutadiene moiety of 99% was synthesized in accordance with the method described in JP-A-60-220147.

Component (a-2)-5

A hydrogenated block copolymer of a styrene/butadiene block copolymer having a structure of B-A-B-A, a number average molecular weight of 70,000, a molecular weight distribution of 1.1, a bonded styrene content of 39% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (b)-1

Show Aromer MK511 (block type polypropylene) manufactured by JPO (MFR: 15 g/10 minutes, flexural modulus: 1400 MPa).

Component (b)-2

Show Aromer M1700 (homopolypropylene) manufactured by JPO (MFR: 31 g/10 minutes, flexural modulus: 1600 MPa).

Component (b)-3

Show Aromer E7100 (block type polypropylene) manufactured by JPO (MFR: 0.5 g/10 minutes, flexural modulus: 1450 MPa).

Component (c)

Diana Process Oil PW-380, a paraffin oil manufactured by Idemitsu (dynamic viscosity: 380 cSt at 40° C.).

EXAMPLES 1 to 8

Use was made of (a-1)-1 and (a-2)-1 as hydrogenated block copolymers, (b)-1 as a polyolefin resin and (c) as a hydrocarbon oil each in the amount as specified in Tables 1 and 2. These components were blended in a Henschel mixer and then melt-kneaded at 220° C. by using a co-rotating twin screw extruder of 45 mm in diameter to obtain pellets of each elastomer composition. Next, these pellets of the elastomer compositions were injection-molded into a plurality of air bag apparatus-housing covers for driver's seat use. These products were evaluated by the aforementioned test methods. Tables 1 and 2 show the results. As these results show, the elastomer of the present invention is excellent in scratch resistance, strength and heat resistance, good in melt characteristics and excellent in injection moldability too. Also, it shows good deployment performance at all of the test temperatures −40° C., 23° C. and 90° C.

Now, the shapes of the housing covers of Examples 1 to 8 will be described with reference to FIGS. 1 to 4. As shown in FIG. 1, the housing cover 1 has a flange 5 therearound having a bold hole 9 to be attached to a retainer (not shown), and is formed in the shape of a box having a space 8 such that one side of the box can be opened and an air bag can be contained therein. A breakable portion 3 having a fragile structure is arranged on a top plate 2 in an H shape as shown by a dotted line in FIG. 1, and to hinge parts 4 are arranged on the top plate 2 as shown by one-dot-and-dash line in FIG. 1.

Figure 2:
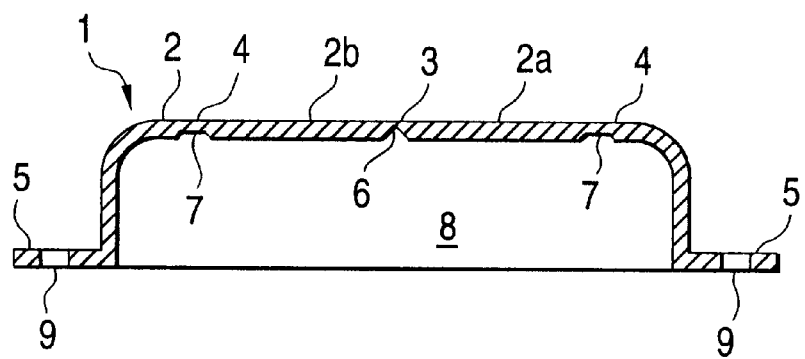
FIG. 2 is a sectional view of the housing cover taking along the II—II line shown in FIG. 1.
Figure 3:
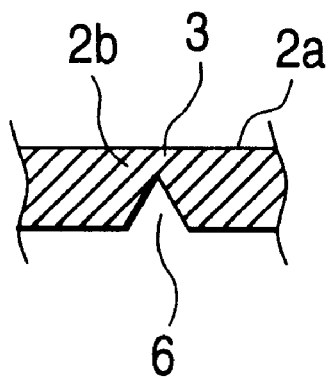
FIG. 3 is an enlarged sectional view of the V shape groove of the housing cover shown in FIG. 2.
Figure 4:
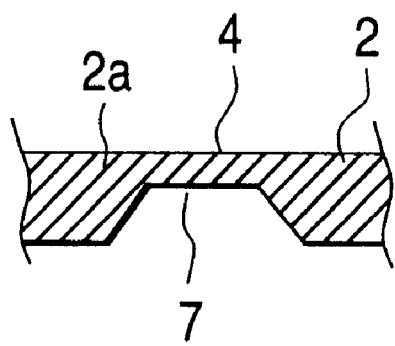
FIG. 4 is an enlarged sectional view of the U shape groove of the housing cover shown in FIG. 3.

The breakable portion 3 is formed by a groove 6 having a V-like sectional shape on the back side of the top plate 2 as shown in FIGS. 2 and 3, and the hinge parts 4 are formed by a groove 7 having a U-like sectional shape on the back side of the top plate 2 as shown in FIGS. 2 and 4. When an air bag (not shown) is inflated, the housing cover 1 breaks at the breakable portion 3 and two doors 2a and 2b are opened with the use of the hinge parts 4 as the axis to release the air bag.

With regard to the size of the breakable portion 3, the parts corresponding to the two bars of the letter "H" are 120 mm and the part corresponding to the crossbar is 150 mm, and the breakable portion has a thickness of 0.5 mm, the hinge parts have a thickness of 2.5 mm and other portions have a thickness of 5 mm.

TABLE 1

| | Ex. 1 | Ex. 2 | Ex. 3 | Ex. 4 |
|---|---|---|---|---|
| Composition (part by wt.) | | | | |
| Component (a-1) | (a-1)-1 | (a-1)-1 | (a-1)-1 | (a-1)-1 |
| Hydrogenated block copolymer | 40 | 50 | 20 | 40 |
| Component (a-2) | (a-2)-1 | (a-2)-1 | (a-2)-1 | (a-2)-1 |
| Hydrogenated block copolymer | 60 | 50 | 80 | 60 |
| Component (b) | (b)-1 | (b)-1 | (b)-1 | (b)-1 |
| Polyolefin resin | 85 | 85 | 85 | 100 |
| Component (c) | (c) | (c) | (c) | (c) |
| Hydrocarbon oil | 35 | 35 | 35 | 35 |
| Physical properties | | | | |
| MFR (g/10 minutes) | 2.0 | 1.3 | 4.0 | 2.8 |
| Hardness (JIS A) | 90 | 89 | 87 | 95 |
| Tensile strength (kgf/cm$^2$) | 120 | 125 | 95 | 150 |
| Elongation (%) | 670 | 680 | 610 | 580 |
| Heat sag | 10 | 7 | 18 | 9 |
| Scratch resistance Gloss retention (%) | 89 | 89 | 86 | 93 |
| De-embossing test | G | G | G | G |
| Moldability | G | G | G | G |
| Deployment performance of cover | | | | |
| −40° C. | good | good | good | good |
| 23° C. | good | good | good | good |
| 90° C. | good | good | good | good |

TABLE 2

| | Ex. 5 | Ex. 6 | Ex. 7 | Ex. 8 |
|---|---|---|---|---|
| Composition (part by wt.) | | | | |
| Component (a-1) | (a-1)-1 | (a-1)-1 | (a-1)-1 | (a-1)-1 |
| Hydrogenated block copolymer | 40 | 40 | 40 | 40 |
| Component (a-2) | (a-2)-1 | (a-2)-1 | (a-2)-1 | (a-2)-1 |
| Hydrogenated block copolymer | 60 | 60 | 60 | 60 |
| Component (b) | (b)-1 | (b)-1 | (b)-1 | (b)-1 |
| Polyolefin resin | 60 | 85 | 85 | 100 |
| Component (c) | (c) | (c) | (c) | (c) |
| Hydrocarbon oil | 35 | 45 | 25 | 10 |
| Physical properties | | | | |
| MFR (g/10 minutes) | 1.0 | 4.0 | 0.8 | 0.5 |
| Hardness (JIS A) | 83 | 87 | 93 | 95 |
| Tensile strength (kgf/cm$^2$) | 110 | 95 | 120 | 140 |
| Elongation (%) | 800 | 790 | 630 | 650 |
| Heat sag | 17 | 17 | 7 | 5 |
| Scratch resistance Gloss retention (%) | 94 | 83 | 92 | 97 |
| De-embossing test | G | G | G | G |
| Moldability | G | G | G | F |
| Deployment performance of cover | | | | |
| −40° C. | good | good | good | good |
| 23° C. | good | good | good | good |
| 90° C. | good | good | good | good |

COMPARATIVE EXAMPLES 1 to 8

Use was made of (a-1)-1, (a-1)-6 and (a-2)-1 as hydrogenated block copolymers, (b)-1 as a polyolefin resin and (c) as a hydrocarbon oil each in the amount as specified in Tables 3 and 4. These components were melt-kneaded and evaluated by the same methods as those employed in Examples 1 to 8. Tables 3 and 4 show the results. It is evident from these results that each composition outside the range of the present invention is poor in some of the physical properties or the deployment performance.

TABLE 3

|  | Comp. Ex. 1 | Comp. Ex. 2 | Comp. Ex. 3 | Comp. Ex. 4 |
|---|---|---|---|---|
| Composition (part by wt.) | | | | |
| Component (a-1) | (a-1)-1 | (a-1)-1 | (a-1)-1 | (a-1)-1 |
| Hydrogenated block copolymer | 70 | 5 | 40 | 40 |
| Component (a-2) | (a-2)-1 | (a-2)-1 | (a-2)-1 | (a-2)-1 |
| Hydrogenated block copolymer | 30 | 95 | 60 | 60 |
| Component (b) | (b)-1 | (b)-1 | (b)-1 | (b)-1 |
| Polyolefin resin | 85 | 85 | 130 | 25 |
| Component (c) | (c) | (c) | (c) | (c) |
| Hydrocarbon oil | 35 | 35 | 35 | 35 |
| Physical properties | | | | |
| MFR (g/10 minutes) | 0.2 | 8 | 5.5 | 0.2 |
| Hardness (JIS A) | 91 | 90 | 96 | 71 |
| Tensile strength (kgf/cm$^2$) | 150 | 75 | 175 | 95 |
| Elongation (%) | 600 | 650 | 580 | 860 |
| Heat sag | 7 | 28 | 83 | 90 |
| Scratch resistance Gloss retention (%) | 92 | 79 | 83 | 90 |
| De-embossing test | G | P | G | G |
| Moldability | W | G | G | W |
| Deployment performance of cover | | | | |
| −40° C. | good | good | good | good |
| 23° C. | good | good | good | good |
| 90° C. | good | poor | poor | good |

TABLE 4

|  | Comp. Ex. 5 | Comp. Ex. 6 | Comp. Ex. 7 | Comp. Ex. 8 |
|---|---|---|---|---|
| Composition (part by wt.) | | | | |
| Component (a-1) | (a-1)-1 | (a-1)-1 | (a-1)-6 | (a-1)-6 |
| Hydrogenated block copolymer | 70 | 40 | 40 | 50 |
| Component (a-2) | (a-2)-1 | (a-2)-1 | (a-2)-1 | (a-2)-1 |
| Hydrogenated block copolymer | 30 | 60 | 60 | 50 |
| Component (b) | (b)-1 | (b)-1 | (b)-1 | (b)-1 |
| Polyolefin resin | 85 | 85 | 85 | 85 |
| Component (c) | (c) | (c) | (c) | (c) |
| Hydrocarbon oil | 60 | 60 | 35 | 35 |
| Physical properties | | | | |
| MFR (g/10 minutes) | 4.0 | 9.0 | 6.0 | 5.0 |
| Hardness (JIS A) | 80 | 79 | 90 | 87 |
| Tensile strength (kgf/cm$^2$) | 140 | 80 | 73 | 89 |
| Elongation (%) | 870 | 850 | 650 | 670 |
| Heat sag | 10 | 35 | 25 | 25 |
| Scratch resistance Gloss retention (%) | 64 | 63 | 81 | 82 |
| De-embossing test | G | F | F | F |
| Moldability | G | G | G | G |
| Deployment performance of cover | | | | |
| −40° C. | good | good | good | good |
| 23° C. | good | good | good | good |
| 90° C. | good | good | good | good |

EXAMPLES 9 to 14

Use was made of (a-1)-1, (a-1)-2, (a-1)-3, (a-1)-4, (a-2)-1, (a-2)-2, and (a-2)-3 as hydrogenated block copolymers, (b)-1 and (b-2) as a polyolefin resin and (c) as a hydrocarbon oil each in the amount as specified in Tables 5 and 6. These components were melt-kneaded and evaluated by the same methods as those employed in Examples 1 to 8. Tables 5 and 6 show the results. It is evident from these results that each elastomer composition of the present invention is excellent in scratch resistance, strength and heat resistance, good in melt characteristics and excellent in injection moldability too. Also, it shows good deployment performance at all of the test temperatures −40° C., 23° C. and 90° C.

TABLE 5

|  | Ex. 9 | Ex. 10 | Ex. 11 | Ex. 12 |
|---|---|---|---|---|
| Composition (part by wt.) | | | | |
| Component (a-1) | (a-1)-2 | (a-1)-3 | (a-1)-4 | (a-1)-4 |
| Hydrogenated block copolymer | 40 | 40 | 40 | 40 |
| Component (a-2) | (a-2)-2 | (a-2)-3 | (a-2)-1 | (a-2)-1 |
| Hydrogenated block copolymer | 60 | 60 | 60 | 60 |
| Component (b) | (b)-1 | (b)-1 | (b)-1 | (b)-1 |
| Polyolefin resin | 85 | 85 | 85 | 85 |
| Component (c) | (c) | (c) | (c) | (c) |
| Hydrocarbon oil | 35 | 35 | 35 | 10 |
| Physical properties | | | | |
| MFR (g/10 minutes) | 4.0 | 2.0 | 3.5 | 1.5 |
| Hardness (JIS A) | 89 | 90 | 91 | 95 |
| Tensile strength (kgf/cm$^2$) | 98 | 95 | 120 | 135 |
| Elongation (%) | 640 | 600 | 660 | 630 |
| Heat sag | 21 | 20 | 15 | 6 |
| Scratch resistance Gloss retention (%) | 92 | 85 | 92 | 97 |
| De-embossing test | G | G | G | G |
| Moldability | G | F | G | G |
| Deployment performance of cover | | | | |
| −40° C. | good | good | good | good |
| 23° C. | good | good | good | good |
| 90° C. | good | good | good | good |

TABLE 6

|  | Ex. 13 | Ex. 14 |
|---|---|---|
| Composition (part by wt.) | | |
| Component (a-1) | (a-1)-1 | (a-1)-1 |
| Hydrogenated block copolymer | 40 | 40 |
| Component (a-1) | (a-1)-1 | (a-1)-1 |
| Hydrogenated block | 30 | 30 |
| copolymer | (a-2)-2 | (a-2)-2 |
|  | 30 | 30 |
| Component (b) | (b)-1 | (b)-2 |
| Polyolefin resin | 85 | 85 |
| Component (c) | (c) | (c) |
| Hydrocarbon oil | 25 | 25 |
| Physical properties | | |
| MFR (g/10 minutes) | 2.0 | 3.0 |
| Hardness (JIS A) | 93 | 95 |
| Tensile strength (kgf/cm$^2$) | 130 | 135 |
| Elongation (%) | 680 | 670 |
| Heat sag | 17 | 12 |
| Scratch resistance | 92 | 92 |

TABLE 6-continued

|  | Ex. 13 | Ex. 14 |
|---|---|---|
| Gloss retention (%) | | |
| De-embossing test | G | G |
| Moldability | G | G |
| Deployment performance of cover | | |
| −40° C. | good | good |
| 23° C. | good | good |
| 90° C. | good | good |

COMPARATIVE EXAMPLES 9 to 12

Use was made of (a-1)-1, (a-1)-5, (a-2)-1, (a-2)-4 and (a-2)-5 as hydrogenated block copolymers, (b)-1 as a polyolefin resin and (c) as a hydrocarbon oil each in the amount as specified in Tables 7. These components were melt-kneaded and evaluated by the same methods as those employed in Examples 1 to 8. Table 7 shows the results. It is evident from these results that each composition outside the range of the present invention is poor in some of the physical properties or the deployment performance.

TABLE 7

|  | Comp. Ex. 9 | Comp. Ex. 10 | Comp. Ex. 11 | Comp. Ex. 12 |
|---|---|---|---|---|
| Composition (part by wt.) | | | | |
| Component (a-1) | (a-1)-5 | (a-1)-1 | (a-1)-1 | (a-1)-1 |
| Hydrogenated block copolymer | 40 | 40 | 40 | 40 |
| Component (a-2) | (a-2)-1 | (a-2)-4 | (a-2)-5 | (a-2)-1 |
| Hydrogenated block copolymer | 60 | 60 | 60 | 60 |
| Component (b) | (b)-1 | (b)-1 | (b)-1 | (b)-3 |
| Polyolefin resin | 85 | 85 | 85 | 85 |
| Component (c) | (c) | (c) | (c) | (c) |
| Hydrocarbon oil | 35 | 35 | 35 | 35 |
| Physical properties | | | | |
| MFR (g/10 minutes) | 0.8 | 6.5 | 1.1 | 0.1 |
| Hardness (JIS A) | 93 | 90 | 93 | 90 |
| Tensile strength (kgf/cm$^2$) | 130 | 95 | 125 | 115 |
| Elongation (%) | 600 | 580 | 610 | 670 |
| Heat sag | 8 | 30 | 10 | 15 |
| Scratch resistance Gloss retention (%) | 81 | 85 | 82 | 88 |
| De-embossing test | G | P | G | G |
| Moldability | P | G | G | W |
| Deployment performance of cover | | | | |
| −40° C. | poor | good | poor | good |
| 23° C. | good | good | good | good |
| 90° C. | good | poor | poor | good |

Because of having excellent scratch resistance, strength, heat resistance, flexibility and moldability, the elastomer composition of the present invention can be used suitably in the fields of automobile parts, electric household appliances, toys, miscellaneous goods and the like. Because of its excellent scratch resistance, in particular, it can be applied suitably to automobile interior parts (interior panel, arm rest, handle, horn pad, etc.) and automobile exterior parts (weatherstrip, bumper, etc.) which require good product appearance. Also, the air bag apparatus-housing cover obtained from the elastomer composition of the present invention can provide excellent air-bag deployment performance over a broad temperature range of from −40 to 90° C. without generating cracking except for its breaking part or causing scattering of the cover. In addition, since the elastomer composition shows excellent scratch resistance on the surface of molded products and has excellent moldability, it can be processed without resort to any painting process required in the conventional methods, which makes it possible to establish a high productivity and a low cost.

While the invention has been described in detail with reference to specific examples thereof, it will be apparent to one skilled in the art that various changes and modifications can be made therein without departing from the spirit and scope thereof.

What is claimed is:

1. A housing cover of air bag apparatus having a monolayer structure which comprises an elastomer composition which comprises:

(a) 100 parts by weight of hydrogenated block copolymer mixture comprising:
(a-1) 10 to 60 parts by weight of a block copolymer prepared by hydrogenating a block copolymer that comprises:
at least two polymer blocks A each mainly comprising a vinyl aromatic compound; and
at least one polymer block B mainly comprising a conjugated diene compound,
the hydrogenated block copolymer having a number average molecular weight of from more than 200,000 to not more than 400,000 and a content of the polymer block A of from 15 to 40% by weight of said block copolymer; and
(a-2) 40 to 90 parts by weight of a block copolymer prepared by hydrogenating a block copolymer that comprises:
at least one polymer block A mainly comprising a vinyl aromatic compound; and
at least one polymer block B mainly comprising a conjugated diene compound,
the hydrogenated block copolymer having a number average molecular weight of from more than 30,000 to not more than 140,000 and a content of the polymer block A of from 8 to 35% by weight of said block copolymer; and (b) 30 to 125 parts by weight of a polypropylene resin having a melt flow rate of from 5 to 100 g/10 minutes;

(c) 0 to 50 parts by weight of a hydrocarbon oil.

2. The housing cover according to claim 1, wherein said vinyl aromatic compound is styrene and said conjugated diene compound is butadiene, isoprene or a combination thereof.

3. The housing cover according to claim 1, wherein said polypropylene resin substantially composed of either or both of a propylene homopolymer and a copolymer of propylene with a $C_{2-8}$ α-olefin, and has a flexural modulus substantially not less than 800 MPa.

4. The housing cover according to claim 1, wherein said hydrocarbon oil is a non-aromatic mineral oil.

5. The housing cover according to claim 1, wherein said content of said hydrocarbon oil is 10 to 40 parts by weight.

* * * * *